United States Patent
Srdic et al.

(10) Patent No.: US 9,330,441 B2
(45) Date of Patent: May 3, 2016

(54) AUTOMATED SELECTION OF FILTER PARAMETERS FOR SEISMIC ANALYSIS

(71) Applicants: Andjelka Srdic, Phoenix, AZ (US); Rafael Pacheco, Gilbert, AZ (US); Bin Qin, Phoenix, AZ (US); Denis Malov, Scottsdale, AZ (US)

(72) Inventors: Andjelka Srdic, Phoenix, AZ (US); Rafael Pacheco, Gilbert, AZ (US); Bin Qin, Phoenix, AZ (US); Denis Malov, Scottsdale, AZ (US)

(73) Assignee: SAP SE, Walldorf, DE (US)

( * ) Notice: Subject to any disclaimer, the term of this patent is extended or adjusted under 35 U.S.C. 154(b) by 184 days.

(21) Appl. No.: 14/196,755

(22) Filed: Mar. 4, 2014

(65) Prior Publication Data

US 2015/0254812 A1    Sep. 10, 2015

(51) Int. Cl.
*G06K 9/40* (2006.01)
*G06T 5/00* (2006.01)
*G01V 1/34* (2006.01)
*G01V 1/36* (2006.01)

(52) U.S. Cl.
CPC . *G06T 5/002* (2013.01); *G06K 9/40* (2013.01); *G01V 1/345* (2013.01); *G01V 1/364* (2013.01); *G06T 2207/20024* (2013.01); *G06T 2207/20182* (2013.01); *G06T 2207/30181* (2013.01)

(58) Field of Classification Search
CPC ........... G06T 5/10; G06T 5/002; G06T 5/003; G06T 2207/20024; G06T 2207/20076; G06T 2207/20182; G06T 2207/20192; G06T 2207/30004; G06T 2207/30112; G06T 2207/30181; G06K 9/40; G01V 1/003; G01V 1/28; G01V 1/30; G01V 1/301; G01V 1/306; G01V 1/36; G01V 1/345; G01V 1/364; G01V 1/368; G01V 1/42; G01V 2200/14; G01V 2210/32; G01V 2210/34; G01V 2210/57; G01V 2210/6161; G01V 2210/63; G01V 2210/74
See application file for complete search history.

(56) References Cited

U.S. PATENT DOCUMENTS

| | | | | |
|---|---|---|---|---|
| 8,463,551 | B2 * | 6/2013 | Aarre | G01V 1/301 702/16 |
| 2004/0122596 | A1 * | 6/2004 | Sudhakar | G01V 1/42 702/17 |
| 2011/0118985 | A1 * | 5/2011 | Aarre | G01V 1/301 702/16 |
| 2012/0004849 | A1 * | 1/2012 | Aarre | G06F 17/14 702/14 |
| 2015/0241584 | A1 * | 8/2015 | Aarre | G01V 1/36 367/7 |

* cited by examiner

*Primary Examiner* — Jose Couso
(74) *Attorney, Agent, or Firm* — Fountainhead Law Group PC

(57) ABSTRACT

A filter selection technique is described for automatically selecting filters and filter parameters to apply to a given input data. The technique first receives input data and accesses a library storing information from previously analyzed data. The technique selects an entry from the library where the entry contains data that is correlated with the input data. The technique then applies a filter to the input data. The filter and filter parameters are determined by the selected entry.

20 Claims, 9 Drawing Sheets

AUTOMATED SELECTION OF FILTER PARAMETERS FOR SEISMIC ANALYSIS

BACKGROUND

Seismic surveys are commonly performed by oil and gas companies as they explore the subsurface for natural resources. A seismic survey consists of a seismic source that generates seismic shots towards the subsurface. As the seismic shots travel down through different materials in the subsurface, reflections are created that bounce back up towards the surface. This reflection data is recorded by detectors at the surface and can be processed to reconstruct 2D or 3D images of the subsurface. The subsurface images can be used to identify potential areas containing desired natural resources.

However, the subsurface images generated are often corrupted with noise that is present in the survey system. During seismic data acquisition, acoustic waves, coherent noise, and random noise reach detectors by propagating via the surface, and as reflected and refracted waves propagating through geological layers. The most useful parts of the seismic signals are primary reflections and all other seismic waves are considered to be coherent noise. This noise corrupts the reflection data, making it difficult to generate accurate images of the subsurface.

Traditionally, geologists have manually applied noise filters to clean up the noise in the corrupted reflection data. However, this manual process typically takes 3-6 months given the amount of data to process. This long delay can be unacceptable, particularly when a seismic shot needs to be repeated due to user or instrument error. Often times the geologist is no longer on site and cannot repeat the test.

SUMMARY

In one embodiment, a computer-implemented method receives, by a processor, a first image data being corrupted by a first noise. The method then accesses, by the processor, a library storing information from previously analyzed image data. The method then automatically selects, by one or more processors, an entry from the library according to the first image data. The method then applies, by the processor, a noise filter to the first image data to reduce the noise in the first image data, wherein the noise filter is applied according to a first filter parameter specified by the entry. The method can be performed using parallelization across multiple processors to achieve better performance.

In another embodiment, a non-transitory computer readable storage medium stores one or more programs comprising instructions for receiving a first image data being corrupted by a first noise, accessing a library storing information from previously analyzed image data, automatically selecting an entry from the library according to the first image data, and applying a noise filter to the first image data to reduce the noise in the first image data, wherein the noise filter is applied according to a first filter parameter specified by the entry.

In another embodiment, a computer implemented system comprises one or more computer processors and a non-transitory computer-readable storage medium. The non-transitory computer-readable storage medium comprises instructions, that when executed, control the one or more computer processors to be configured for receiving a first image data being corrupted by a first noise, accessing a library storing information from previously analyzed image data, automatically selecting an entry from the library according to the first image data, and applying a noise filter to the first image data to reduce the noise in the first image data, wherein the noise filter is applied according to a first filter parameter specified by the entry.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments described herein provide a technique for automatically selecting a filter and/or filter parameters to apply to data (or signals). The filter, when applied, can remove some unwanted component or feature that is corrupting the data or signal. For example, seismic image data can be corrupted by noise when it is recorded. As a result, a noise reduction filter can be applied to the seismic image data to reduce the noise. With the use of the proper noise reduction filter and filter parameters, the noise that is corrupting the seismic image data can be reduced or removed, thus allowing accurate renditions of the subsurface to be generated.

Traditionally, a session can record image data for a partition of the subsurface. The filter and filter parameters appropriate for a current image data record in the current session can be automatically determined by evaluating entries in a data library. Each entry in the data library includes corrupted image data and the filter and/or filter parameters applied to corrupted image data. The corrupted image data can be survey data (e.g., image data that is measured and collected) from the current session, survey data from a previous session, or simulated data generated from data simulations. A classification algorithm can be applied to the seismic image data to identify one or more entries containing corrupted image data that resembles, is similar to, or is correlated with the current image data record. Matching entry (or entries) can be examined to determine recommended filter and/or filter parameters be applied to the seismic image data. The recommended filter and/or filter parameters can be the same or similar to the parameters applied to the corrupted image data of the matching entry or entries.

Figure 1:
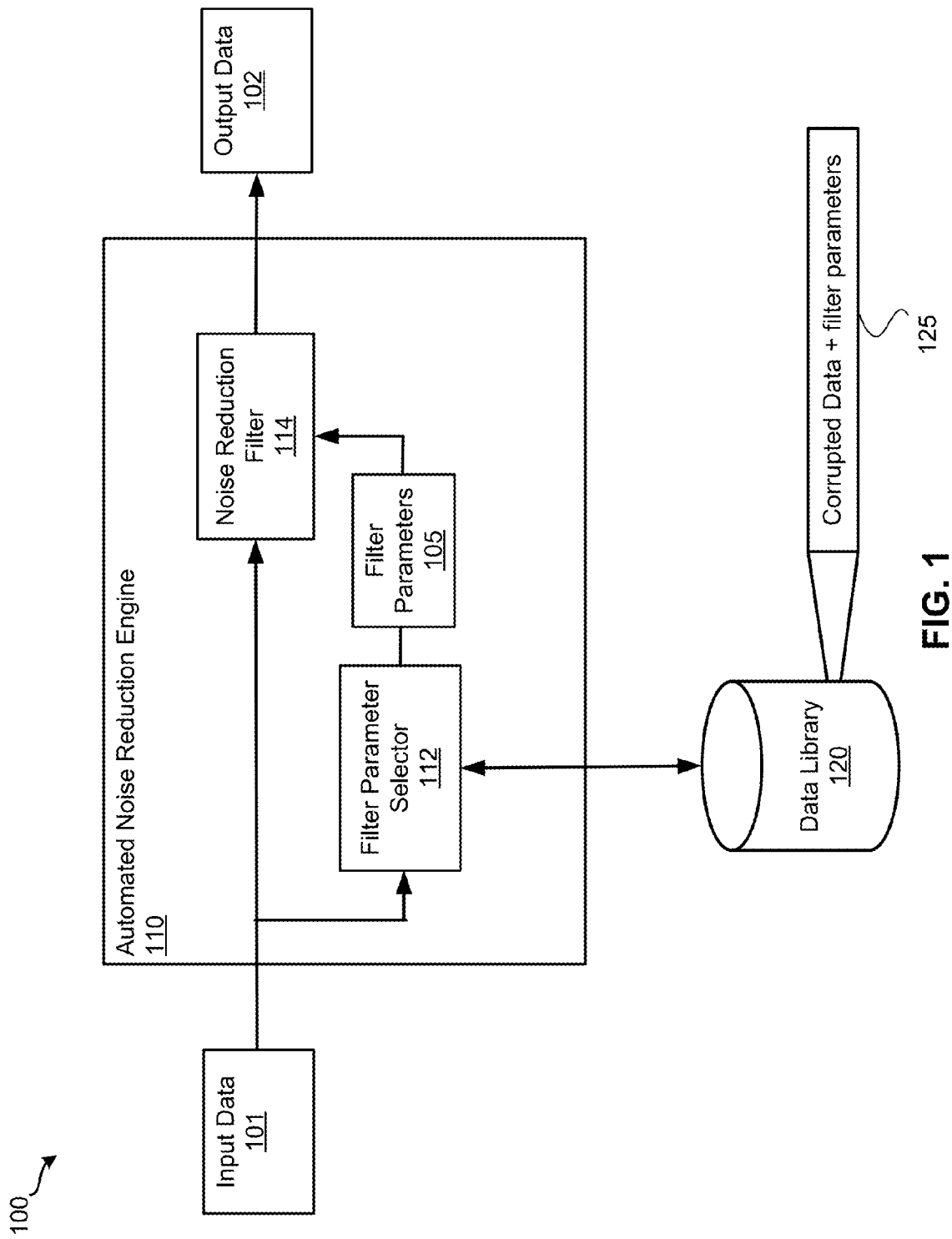
FIG. 1 illustrates a system according to one embodiment.

FIG. 1 illustrates system 100 according to one embodiment. System 100 includes input data 101, automated noise reduction engine 110, and output data 102. Input data 101 can be image data or other types of signals and data. In some examples, input data 101 can be a selected image data record from a current session. The current session can be for recording seismic data to generate an image of the subsurface, for example. Automated noise reduction engine 110 is configured to receive input data 101 and generate output data 102 which is a filtered version of input data 101. Filtering can remove certain properties or attributes that have corrupted input data 101. The corruption can result from noise that occurs during the capturing, storing, or processing of the data.

As shown, automated noise reduction engine 110 can include filter parameter selector 112. Filter parameter selector 112 is configured to automatically select filter parameters that are to be applied to input data 101. Filter parameters can be selected based on input data 101 and data library 120. The data library 120 includes multiple entries such as entry 125. Entry 125 stores corrupted data along with filter parameters that were applied to a filter to clean up the corrupted data. In one example, the corrupted data can be simulated. In another example, the corrupted data can be previously measured input data. In some examples, data library 120 can be organized such that entries belonging to the same session are stored together.

In one embodiment, filter parameter selector 112 can be configured to analyze input data 101 to identify an entry in data library 120 that includes corrupted data which is correlated with input data 101. A classification algorithm of filter parameter selector 112 (not shown) can be utilized to determine the correlation between an entry's corrupted data and input data 101. The classification algorithm can be applied to data library 120 to identify one or more entries that contain corrupted data that is a good match for input data 101. Filter parameter selector 112 can select filter parameters 105 based on the identified entries.

In one embodiment, entries in data library 120 that were generated during a previous session can be evaluated by the classification algorithm. In another embodiment, entries in data library 120 that include manually selected filter parameters can be evaluated by the classification algorithm. This allows filter parameter selector 112 to select an entry containing manually selected filter parameters to apply to input data 101. In yet another embodiment, entries in data library 120 that are related to the current session can be evaluated by the classification algorithm. This can allow filter parameter selector 112 to generate filter parameters based on other data in the current session.

Automated noise reduction engine 110 also includes noise reduction filter 114. Noise reduction filter 114 can be one of many noise reduction filters known in the art that reduce the noise in input data 102. In other embodiments, other types of filters besides noise reduction filters can be applied. In one embodiment, noise reduction filter 114 can filter input data 102 according to filter parameters 105 supplied from filter parameter selector 112. The output of noise reduction filter 114 can be output data 102, which is a filtered version of input data 101.

In one embodiment, system 100 can examine output data 102 to evaluate the performance of filter parameters 105 on input data 101. If the noise in input data 101 has sufficiently been removed (e.g., noise removed from input data 101 is above a predefined threshold, noise in output data 102 is below a predefined threshold, or clarity of output data 102 is above a predefined threshold), system 100 can store input data 101 along with filter parameters 105 in a new entry in data library 120. This can provide a feedback loop that allows data library 120 to grow as data is processed by automated noise reduction engine 110.

Figure 2:
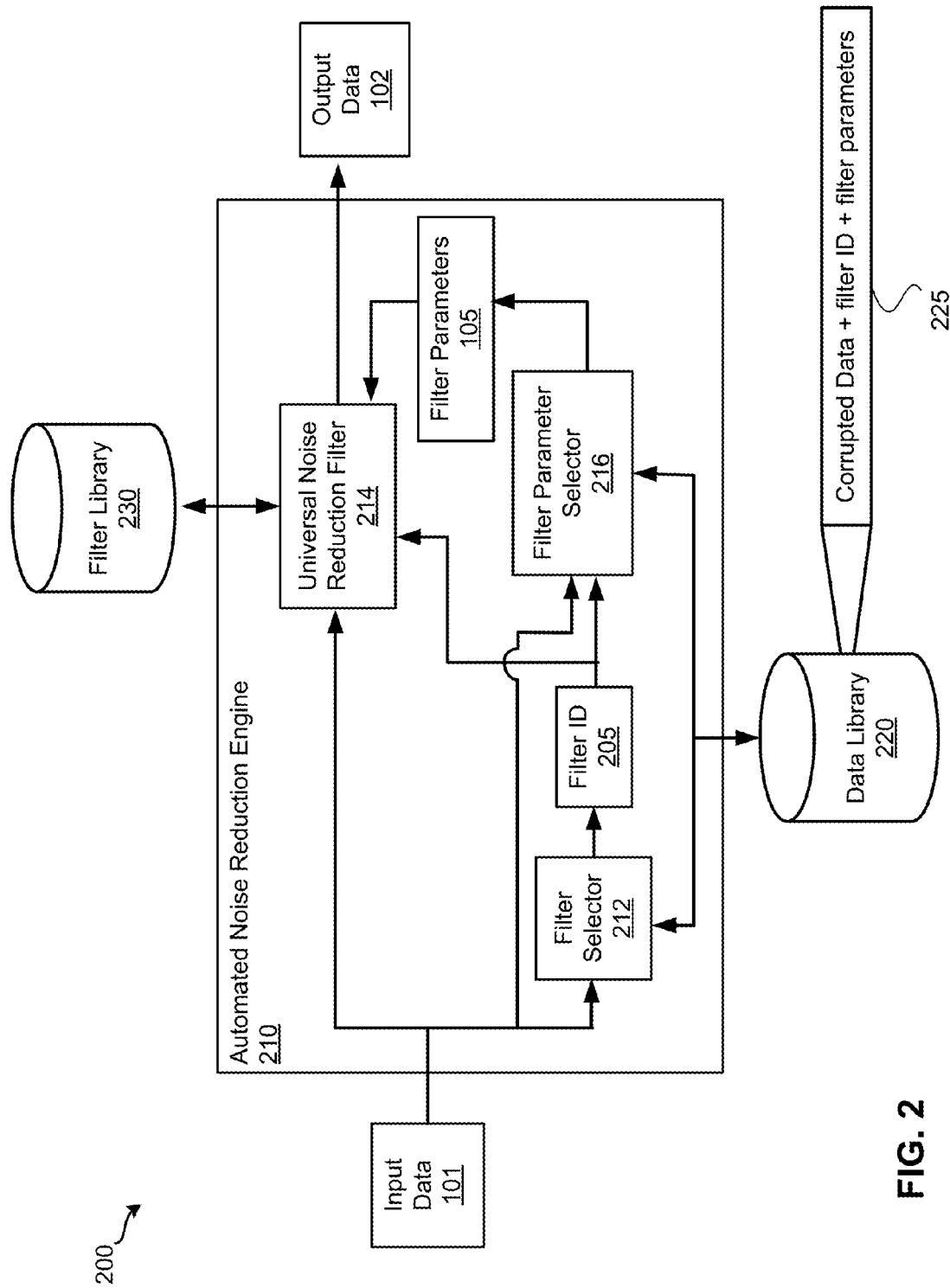
FIG. 2 illustrates a system according to one embodiment.

FIG. 2 illustrates system 200 according to one embodiment. System 200 includes input data 101, automated noise reduction engine 210, and output data 102. Automated noise reduction engine 210 is configured to generate output data 102, which is a version of input data 101 with reduced noise. Automated noise reduction engine 210 includes filter selector 212. Filter selector 212 can select a filter from a plurality of filters to apply to input data 101. The selected filter can be represented by filter ID 205. In one example, filter selection can occur by comparing input data 101 to the corrupted data in entries of data library 220. Data library 220 is similar to data library 120 of FIG. 1 except that each entry in data library 220 includes an additional field to store the filter ID of the filter applied to the corrupted data. Entries having corrupted data that are correlated with input data 101 can be grouped and the filter that was applied to the entries' corrupted data can be examined to determine the filter to apply to input data 101. In one example, filter selector 212 can generate filter ID 205 based on data library 120 and input data 101.

Automated noise reduction engine 210 further includes filter parameter selector 216. Filter parameter selector 216 can be similar or substantially similar to filter parameter selector 112 of FIG. 1. Unlike filter parameter selector 112 of FIG. 1, filter parameter selector 216 receives filter ID 205 as an input to narrow the entries examined in data library 220. In one embodiment, filter parameter selector 216 examines entries in data library 120 that have a filter ID that matches filter ID 205 and skips entries in data library 120 that have a filter ID that does not match filter ID 205. Examined entries can be examined using a classification algorithm to determine whether the entry's corrupted data is correlated with input data 101. Entries with corrupted data that is correlated with input data 101 are further examined and used to generate filter parameters 105.

Automated noise reduction engine further includes universal noise reduction filter 214. Universal noise reduction filter 214 can be capable of applying a filter from a variety of filters stored in filter library 230. Universal noise reduction engine 214 can receive filter ID 205 and filter parameters 105 to configure a filter in filter library 230. In one example, universal noise reduction filter 214 can apply a filter from filter library 230 that matches filter ID 205. Once configured, the filter is applied to input data 101 to generate output data 102.

Figure 3:
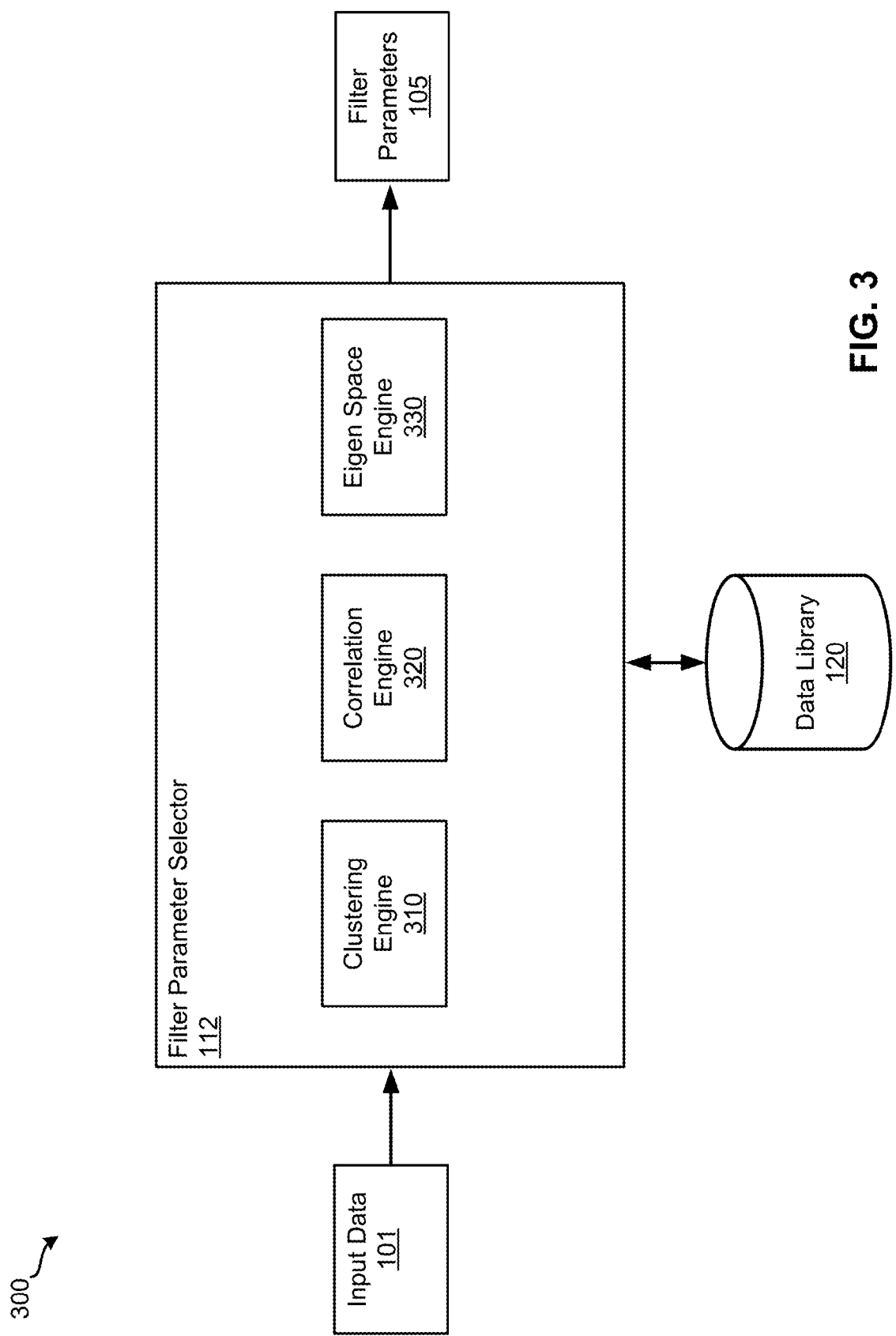
FIG. 3 illustrates a system according to one embodiment.

FIG. 3 illustrates system 300 according to one embodiment. System 300 includes input data 101, filter parameter selector 112, and filter parameters 105. Filter parameter selector 112 is configured to generate filter parameters 105 based on input data 101 and data library 120. Filter parameter selector 112 includes one or more processing engines to process data library 120. In one embodiment, filter parameter selector 112 includes clustering engine 310. Clustering engine 310 is configured to cluster entries in data library 120 that are similar to input data 101. In another embodiment, filter parameter selector 112 includes correlation engine 320. Correlation engine 320 is configured to assign a correlation score for input data 101 and an entry's corrupted data in data library 120. In another embodiment, filter parameter selector 112 includes eigen space engine 330. Eigen space engine 330 is configured to examine input data 101 and an entry's corrupted data in the eigen space domain. In other examples, input data and entries in data library 120 can be evaluated in another space.

Figure 4A:
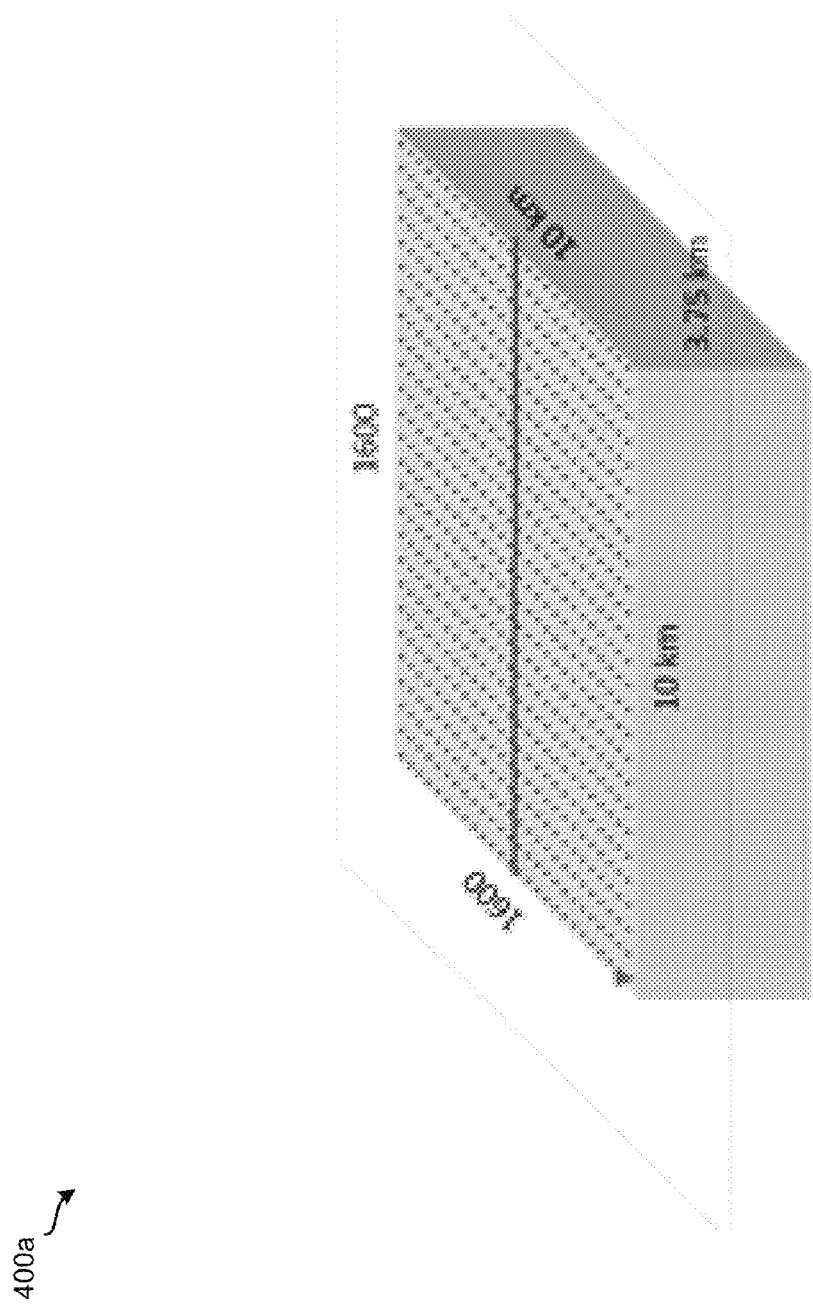
FIG. 4a illustrates a session according to one embodiment.

FIG. 4a illustrates a session according to one embodiment. Session 400a is a 10 km by 10 km area that is being examined.

Imaging data can be collected on a predefined interval in the area. Here, 1600×1600 data points are being collected in the area. Thus, 1600 lines of 1600 data points are being collected during session 400a.

Figure 4B:
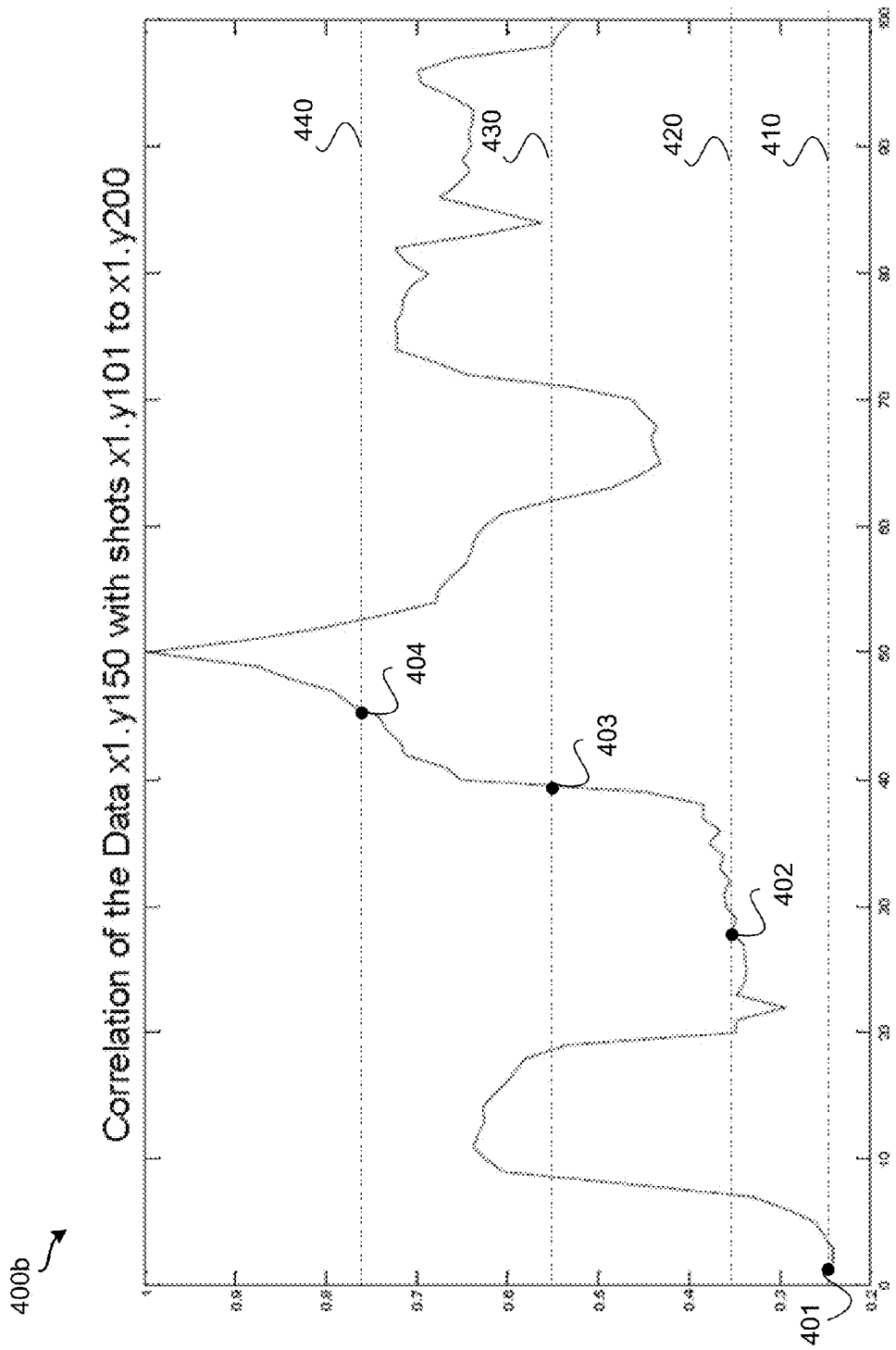
FIG. 4b illustrates a correlation chart of input data to corrupted data stored in a data library according to one embodiment.

FIG. 4b illustrates a correlation chart of input data to corrupted data stored in a data library according to one embodiment. As shown, correlation chart 400 illustrates the correlation of input data to a collection of measured data. The collection of measured data are collected from a series of seismic shots that lie along the same seismic line. Here, the series of seismic shots took place at x-coordinate 1 and y-coordinates between 1 and 200. In other words, the measured data were collected from a series of seismic shots moving in the y-direction. The input data is shot x1,y150 of that series. As a result, the correlation of seismic shot x1,y150 with itself results in a correlation of 1 in correlation chart 400. Here, seismic shots x1,y101 through x1, y149 have already been processed and are stored in an entry of the data library along with the filter parameters applied to the seismic shot.

In one embodiment, a correlation engine can generate correlation chart 400 and select one or more data points from correlation chart 400 to examine when generating the filter parameters. The selection of one or more data points can be based on the correlation score of each data point. In one example, the correlation engine can select data points that have a correlation value above a predefined threshold or in between a range correlation of values. In another example, a data point can be selected for a set of a predefined correlation values. Here, a data point is selected that has a correlation value of 0.25, 0.35, 0.55, and 0.75 (as represented by dotted lines 410, 420, 430, and 440). The filter parameters that were used for the entries that correspond to those data points are examined to generate the filter parameters to be used for the input data (shot x1, y150).

In another embodiment, the correlation engine can select one or more entries from the data library. The entries can belong to a previous session (e.g., other measured area) or another seismic line. The correlation engine can generate a correlation score for each entry that describes the correlation between the entry's corrupted data and the input data. Entries with a correlation score above a threshold can be further examined to generate filter parameters for the input data.

In yet another embodiment, the correlation engine can select one or more entries from the data library that were generated during the current session. This is an automated process to be created for a new session without using data from previous sessions (of surveyed data or simulated data). In one example, a current session can have multiple data points. A user can manually select a filter and/or filter parameters for a few of the data points. Afterwards, the user can set the system to automatic mode where the filter and filter parameters to be applied to other data points are based on the manually selected filter and/or filter parameters. The results of the automated process can be periodically examined to determine whether the results are satisfactory. If the results are not satisfactory, the user can repeat the filtering of some of the data points to generate additional manually selected filter parameters. Over time, the system can learn from the manually selected filter parameters and apply what was learned in the automated process.

Figure 5:
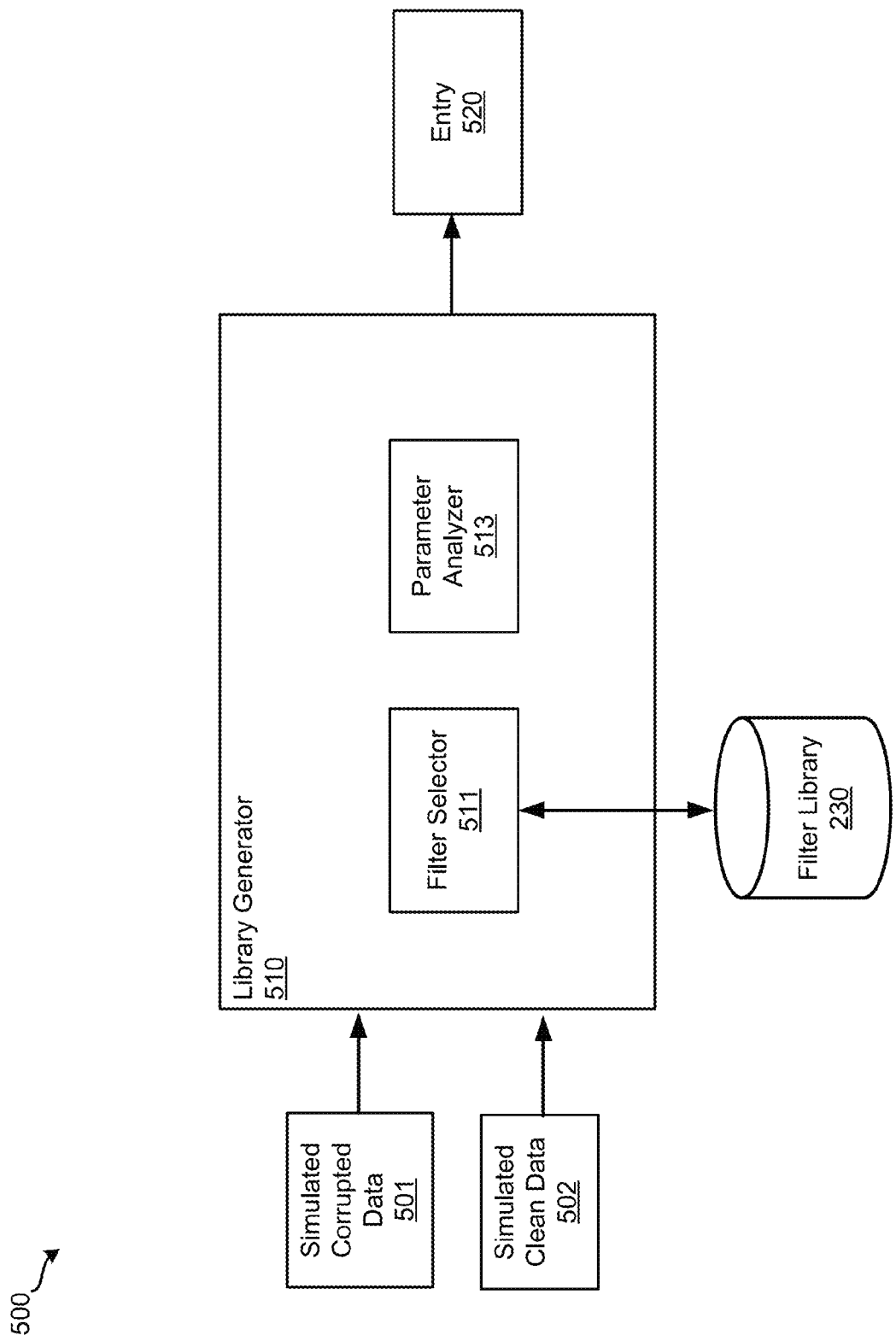
FIG. 5 illustrates a system according to one embodiment.

FIG. 5 illustrates system 500 according to one embodiment. System 500 includes library generator 510 which receives simulated corrupted data 501 and simulated clean data 502. By examining the corrupted data and clean data, library generator 510 can create entry 520 for a data library. Entry 520 can include the filter parameters that, when applied to the filter, can generate a close or exact rendition of simulated clean data 502 from simulated corrupted data 501.

Library generator 510 includes filter selector 511 and parameter analyzer 513. Filter selector 511 can compare simulated corrupted data 501 and simulated clean data 502 to select a filter that, when applied to simulated corrupted data 501, can generate simulated clean data 502. The filter can be selected from filter library 230. Parameter analyzer 513 can compare simulated corrupted data 501 and simulated clean data 502 to select filter parameters, that when applied to the filter selected by filter selector 511, can generate simulated clean data 502 from simulated corrupted data 501. Once the filter and the filter parameters are selected, library generator 510 can generate entry 520. Entry 520 can include simulated corrupted data 501 (in its entirety or a portion of), the filter ID from filter selector 511, and the filter parameters from parameter analyzer 513.

In some examples, library generator 510 can cluster generated entries and store them in the data library to simplify searching. For example, entries from the same session can be clustered together in the data library. As another example, entries from the same seismic line can be clustered together in the data library.

Figure 6B:
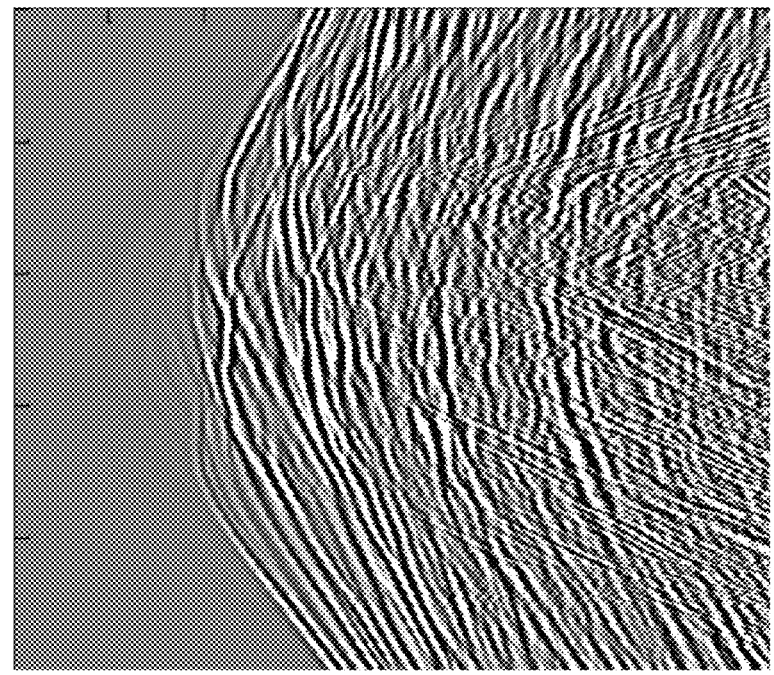
FIG. 6b illustrates a chart displaying output data according to on embodiment.
Figure 6A:
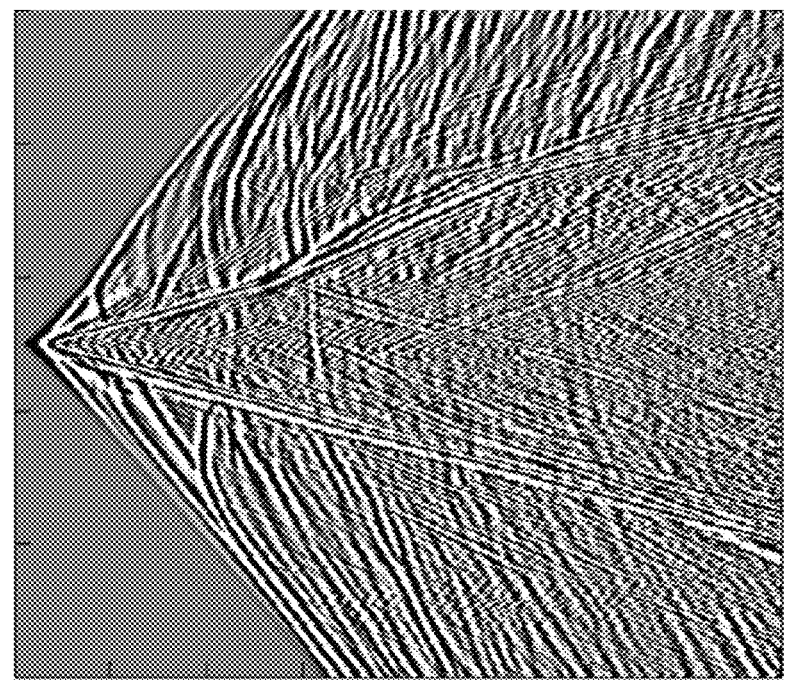
FIG. 6a illustrates a chart displaying input data according to one embodiment.

FIG. 6a illustrates chart 600a displaying input data according to one embodiment. As shown in chart 600a, the input data has noise in the middle that is shaped like a triangle, possibly from the seismic shot that is used to generate the data. FIG. 6b illustrates chart 600b displaying output data according to one embodiment. The output data can be a version of the input data shown in chart 600a that has less noise. As shown in chart 600b, the noise in chart 600a that is shaped like a triangle has been partially removed by applying a filter and filter parameters that were automatically selected according to the input data.

Figure 7:
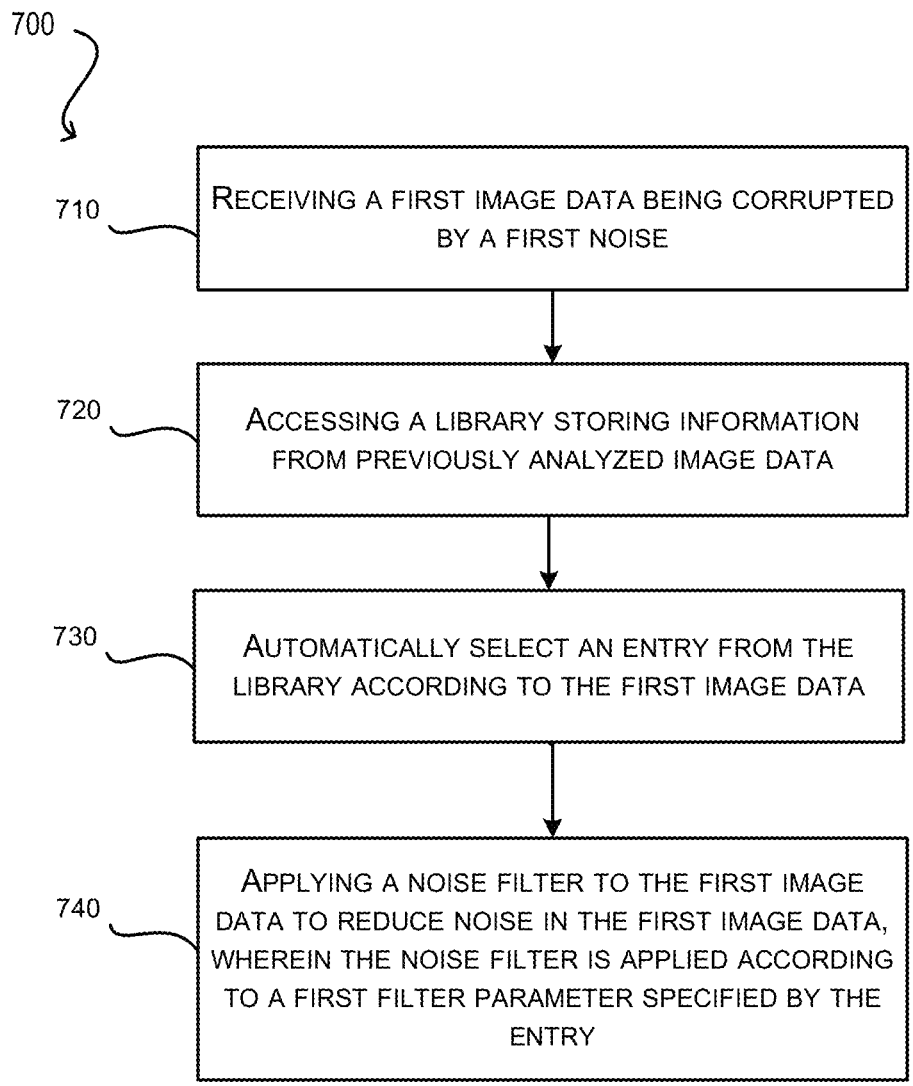
FIG. 7 illustrates a process flow for providing a searching a database according to one embodiment.

FIG. 7 illustrates a process flow for providing a searching a database according to one embodiment. Process 700 can be stored in computer readable medium and executed by a processor. Process 700 begins by receiving a first image data being corrupted by a first noise at 510. In one example, the first image data can be seismic data collected in response to a seismic shot and the first noise can be noise caused by the seismic shot traveling through the subsurface.

After receiving the first image data, process 700 continues by accessing a library storing information from previously analyzed image data at 720. The library can be a data library storing previously analyzed image data. In one example, the previously analyzed image data is measured data. In another example, the previously analyzed image data is simulated data.

After accessing the library, process 700 can continue by selecting an entry from the library according to the first image data at 730. Selection of the entry can include correlating the first image data to the entry's corrupted image data. In one example, a plurality of entries that are generated from analysis of image data captured from a different session (possibly covering a different region) can be analyzed to select an entry from the plurality of entries that is sufficiently correlated with the first image data such that the same filter/filter parameters applied to the entry's corrupted data can be applied to the first image data. Sufficient correlation can be determined when a correlation value generated to describe the correlation is above a predefined threshold. In another example, multiple entries can be selected from the data library according to the first image data.

After selecting the entry from the library, process 700 can continue by applying a noise filter to the first image data to reduce noise in the first image data at 740. The noise filter can be applied according to a first filter parameter specified by the entry. In other embodiments, multiple entries that were automatically selected according to the first image data can be evaluated to determine the first filter parameter.

Figure 8:
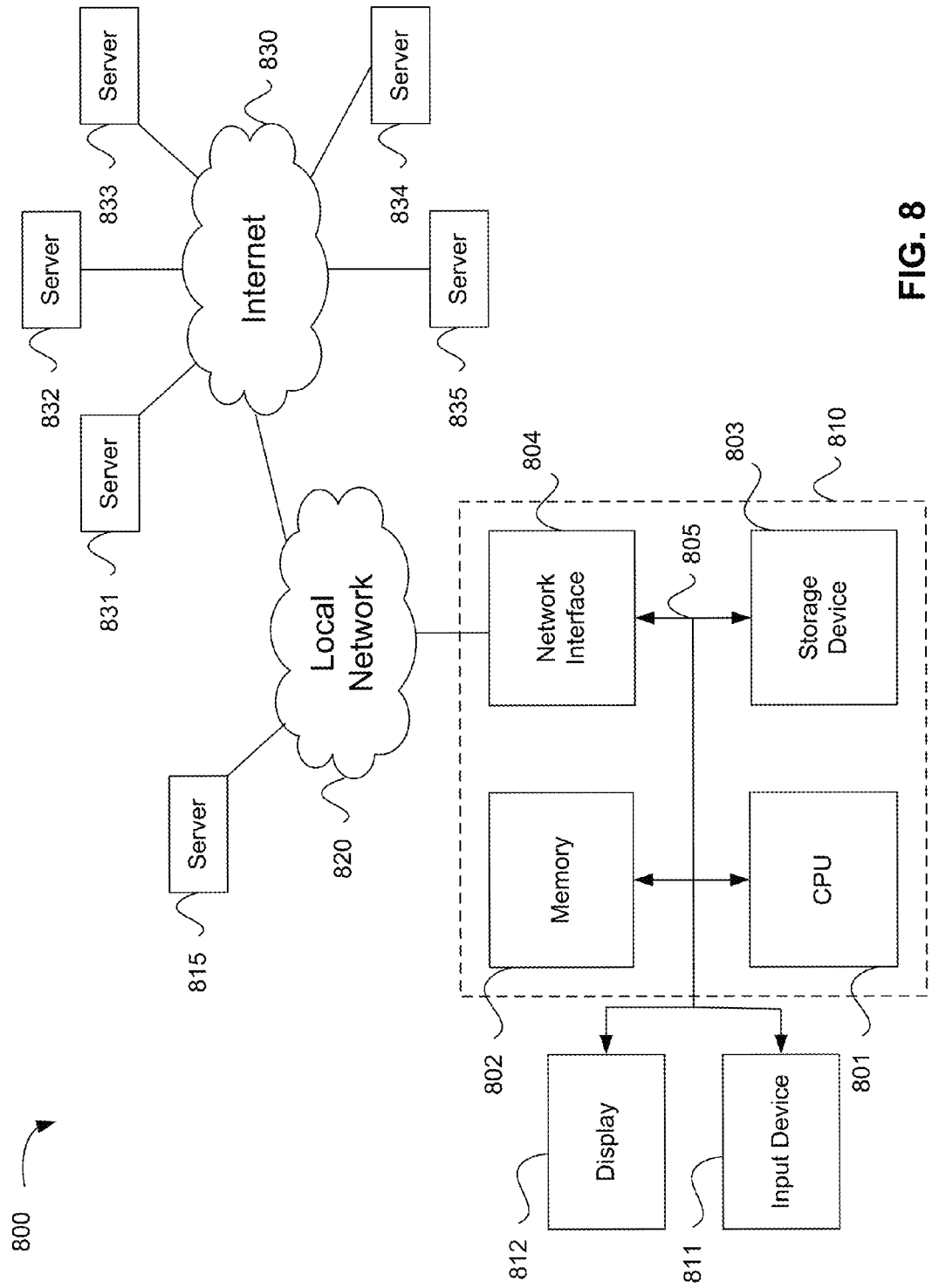
FIG. 8 illustrates an exemplary computer system according to one embodiment.

An exemplary computer system 800 is illustrated in FIG. 8. Computer system 810 includes bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    receiving, by a processor, first image data from a seismic survey of a subsurface being corrupted by first noise;
    accessing, by the processor, a library storing information from previously analyzed image data;
    comparing, by the processor, the first image data with corrupted image data contained in a plurality of entries of the library;
    determining a correlation between the first image data and the corrupted image data of the plurality of entries of the library;
    generating a correlation score for each entry in the library based on the correlation between the first image data and the corrupted image data;
    automatically selecting, by the processor, an entry from the library having a correlation score above a first threshold; and
    applying, by the processor, a noise filter to the first image data to reduce noise in the first image data, wherein the noise filter is applied according to a first filter parameter specified by the selected entry.

2. The computer-implemented method of claim 1 further comprising:
    examining, by the processor, output data to evaluate performance of the noise filter on the first image data;
    determining, by the processor, whether noise in the output data is reduced below a second threshold; and
    storing the first image data and the filter parameter in a new entry in the library when the noise in the output data is reduced below the second threshold.

3. The computer-implemented method of claim 2, wherein the entry includes second image data being corrupted by a second noise and wherein the filter parameter specified by the entry was previously applied to the second image data to reduce the second noise.

4. The computer-implemented method of claim 3, wherein the second image data is simulated image data.

5. The computer-implemented method of claim 1, wherein automatically selecting comprises:
    clustering a group of entries from the library based on the first image data; and
    selecting the entry from the group of entries.

6. The computer-implemented method of claim 1, wherein the first image data is seismic data corresponding to a seismic shot and the previously analyzed image data is previously analyzed seismic data.

7. The computer-implemented method of claim 1, further comprising automatically selecting, by the processor, the noise filter from a plurality of noise filters according to a second filter parameter specified by the entry.

8. A non-transitory computer readable storage medium storing one or more programs, the one or more programs comprising instructions for:
    receiving first image data from a seismic survey of a subsurface being corrupted by first noise;

accessing a library storing information from previously analyzed image data;

comparing, by the processor, the first image data with corrupted image data contained in a plurality of entries of the library;

determining a correlation between the first image data and the corrupted image data of the plurality of entries of the library;

generating a correlation score for each entry in the library based on the correlation between the first image data and the corrupted image data;

automatically selecting an entry from the library having a correlation score above a first threshold; and applying a noise filter to the first image data to reduce the noise in the first image data, wherein the noise filter is applied according to a first filter parameter specified by the selected entry.

9. The non-transitory computer readable storage medium of claim 8 further comprising:

examining, by the processor, output data to evaluate performance of the noise filter on the first image data;

determining, by the processor, whether noise in the output data is reduced below a second threshold; and storing the first image data and the filter parameter in a new entry in the library when the noise in the output data is reduced below the second threshold.

10. The non-transitory computer readable storage medium of claim 9, wherein the entry includes second image data being corrupted by a second noise and wherein the filter parameter specified by the entry was previously applied to the second image data to reduce the second noise.

11. The non-transitory computer readable storage medium of claim 8, wherein automatically selecting comprises:

clustering a group of entries from the library based on the first image data; and selecting the entry from the group of entries.

12. The non-transitory computer readable storage medium of claim 8, wherein the first image data is seismic data corresponding to a seismic shot and the previously analyzed image data is previously analyzed seismic data.

13. The non-transitory computer readable storage medium of claim 8, further comprising automatically selecting, by the processor, the noise filter from a plurality of noise filters according to a second filter parameter specified by the entry.

14. A computer implemented system, comprising:

one or more computer processors; and a non-transitory computer-readable storage medium comprising instructions, that when executed, control the one or more computer processors to be configured for:

receiving first image data from a seismic survey of a subsurface being corrupted by first noise;

accessing a library storing information from previously analyzed image data;

comparing, by the processor, the first image data with corrupted image data contained in a plurality of entries of the library;

determining a correlation between the first image data and the corrupted image data of the plurality of entries of the library;

generating a correlation score for each entry in the library based on the correlation between the first image data and the corrupted image data;

automatically selecting an entry from the library having a correlation score above a first threshold; and applying a noise filter to the first image data to reduce the noise in the first image data, wherein the noise filter is applied according to a first filter parameter specified by the selected entry.

15. The computer implemented system of claim 14 further comprising:

examining, by the processor, output data to evaluate performance of the noise filter on the first image data;

determining, by the processor, whether noise in the output data is reduced below a second threshold; and storing the first image data and the filter parameter in a new entry in the library when the noise in the output data is reduced below the second threshold.

16. The computer implemented system of claim 15, wherein the entry includes second image data being corrupted by a second noise and wherein the filter parameter specified by the entry was previously applied to the second image data to reduce the second noise.

17. The computer implemented system of claim 14, wherein automatically selecting comprises:

clustering a group of entries from the library based on the first image data; and selecting the entry from the group of entries.

18. The computer implemented system of claim 14, further comprising automatically selecting, by the processor, the noise filter from a plurality of noise filters according to a second filter parameter specified by the entry.

19. The computer-implemented method of claim 1 further comprising:

receiving simulated corrupted image data and simulated clean image data;

comparing the simulated corrupted image data with the simulated clean image data;

selecting a filter parameter to be applied to the simulated corrupted image data to generate the simulated clean image data; and building an entry in the library containing the simulated corrupted image data and the filter parameter.

20. The computer-implemented system of claim 14 further comprising:

receiving simulated corrupted image data and simulated clean image data;

comparing the simulated corrupted image data with the simulated clean image data;

selecting a filter parameter to be applied to the simulated corrupted image data to generate the simulated clean image data; and building an entry in the library containing the simulated corrupted image data and the filter parameter.

\* \* \* \* \*